(12) United States Patent
Hoffman

(10) Patent No.: US 9,223,442 B2
(45) Date of Patent: Dec. 29, 2015

(54) PROXIMITY AND TOUCH SENSING SURFACE FOR INTEGRATION WITH A DISPLAY

(71) Applicant: Samsung Display Co., Ltd., Yongin-si, Gyeonggi-do (KR)

(72) Inventor: David Hoffman, Freemont, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 79 days.

(21) Appl. No.: 14/025,660

(22) Filed: Sep. 12, 2013

(65) Prior Publication Data

US 2014/0192023 A1  Jul. 10, 2014

Related U.S. Application Data

(60) Provisional application No. 61/751,184, filed on Jan. 10, 2013.

(51) Int. Cl.
*G06F 3/042* (2006.01)

(52) U.S. Cl.
CPC ............ *G06F 3/0423* (2013.01); *G06F 3/0421* (2013.01); *G06F 2203/04109* (2013.01)

(58) Field of Classification Search
CPC ............ G06F 2203/04109; G06F 2203/04101; G06F 3/042; G06F 3/0421; G06F 3/0423; Y10S 385/901
See application file for complete search history.

(56) References Cited

U.S. PATENT DOCUMENTS

| | | | |
|---|---|---|---|
| 7,351,949 B2 * | 4/2008 | Oon et al. ................ | 250/221 |
| 7,697,053 B2 * | 4/2010 | Kurtz et al. ............. | 348/333.01 |
| 8,094,129 B2 * | 1/2012 | Izadi et al. .............. | 345/173 |
| 8,144,271 B2 * | 3/2012 | Han ......................... | 349/12 |
| 8,184,101 B2 * | 5/2012 | Keam et al. ............. | 345/173 |
| 8,253,896 B2 * | 8/2012 | Yoon et al. ............. | 349/108 |
| 8,259,240 B2 * | 9/2012 | Han ......................... | 349/12 |
| 8,717,568 B2 * | 5/2014 | Arab ........................ | 356/436 |
| 8,766,916 B2 * | 7/2014 | Lu et al. .................. | 345/158 |
| 8,872,778 B2 * | 10/2014 | Smith et al. ............ | 345/173 |
| 8,928,644 B2 * | 1/2015 | Kurokawa et al. ..... | 345/211 |

(Continued)

FOREIGN PATENT DOCUMENTS

| KR | 10-2011-0058333 | 6/2011 |
|---|---|---|
| KR | 10-2011-0064265 | 6/2011 |
| KR | 10-2013-0009967 | 1/2013 |

OTHER PUBLICATIONS

Yi et al., Novel LCDs with IR-sensitive backlights, Journal of the SID 19/1, 2011, pp. 48-56, DOI 10.1889/JSID19.1.48.

(Continued)

*Primary Examiner* — Peter D McLoone
(74) *Attorney, Agent, or Firm* — Christie, Parker & Hale, LLP

(57) ABSTRACT

A system and method for hover detection and touch detection in a display. In one embodiment, a first set of infrared (IR) emitters illuminates the interior of a transparent layer and the IR light is confined to the interior of the layer by total internal reflection, unless an object, such as a finger, touches the surface of the layer. Additional IR emitters at a different wavelength illuminate the volume outside of the display for hover detection. Two sets of wavelength-selective IR sensors, such as quantum dot sensors, are embedded in the display and are used to localize one or more fingers touching, or hovering near, the display.

16 Claims, 12 Drawing Sheets

(56) References Cited

U.S. PATENT DOCUMENTS

| | | | |
|---|---|---|---|
| 2008/0006766 A1* | 1/2008 | Oon et al. | 250/221 |
| 2008/0106629 A1* | 5/2008 | Kurtz et al. | 348/333.01 |
| 2008/0122803 A1* | 5/2008 | Izadi et al. | 345/175 |
| 2008/0284925 A1* | 11/2008 | Han | 349/12 |
| 2009/0091553 A1* | 4/2009 | Keam et al. | 345/175 |
| 2009/0219253 A1* | 9/2009 | Izadi et al. | 345/173 |
| 2009/0245696 A1* | 10/2009 | Yuan et al. | 382/312 |
| 2011/0007021 A1* | 1/2011 | Bernstein et al. | 345/174 |
| 2011/0043487 A1 | 2/2011 | Huang et al. | |
| 2011/0090437 A1* | 4/2011 | Yoon et al. | 349/106 |
| 2011/0115749 A1* | 5/2011 | Yi et al. | 345/175 |
| 2011/0205186 A1* | 8/2011 | Newton et al. | 345/175 |
| 2011/0205209 A1* | 8/2011 | Kurokawa et al. | 345/211 |
| 2011/0221705 A1* | 9/2011 | Yi et al. | 345/175 |
| 2012/0019536 A1* | 1/2012 | Arab | 345/440 |
| 2012/0050180 A1* | 3/2012 | King et al. | 345/173 |
| 2012/0139855 A1* | 6/2012 | Suh et al. | 345/173 |
| 2012/0176298 A1 | 7/2012 | Suh et al. | |
| 2012/0182265 A1* | 7/2012 | Smith et al. | 345/175 |
| 2012/0182266 A1* | 7/2012 | Han | 345/175 |
| 2012/0229418 A1* | 9/2012 | Schwartz et al. | 345/174 |
| 2013/0002715 A1* | 1/2013 | Tidman et al. | 345/629 |
| 2013/0063348 A1* | 3/2013 | Lu et al. | 345/158 |
| 2013/0194199 A1 | 8/2013 | Lynch et al. | |
| 2014/0291479 A1* | 10/2014 | Lu et al. | 250/200 |
| 2014/0313294 A1* | 10/2014 | Hoffman | 348/47 |
| 2015/0015478 A1* | 1/2015 | Hoffman | 345/156 |

OTHER PUBLICATIONS

Cho et al., Nano-Si Optical Pixel-Sensor Array using TFT Technology as Image-Scan/Fingerprint Panel, SID 2013 Digest, pp. 1066-1069, ISSN 0097-966X.

* cited by examiner

PROXIMITY AND TOUCH SENSING SURFACE FOR INTEGRATION WITH A DISPLAY

CROSS-REFERENCE TO RELATED APPLICATION(S)

The present application claims priority to and the benefit of Provisional Application No. 61/751,184, filed Jan. 10, 2013, entitled "DISCLOSURE OF INNOVATION FOR CREATION OF A NOVEL PROXIMITY/TOUCH SENSING SURFACE FOR INTEGRATION WITH AN OLED DISPLAY".

FIELD

The following description relates to touch sensitive displays and more particularly to a system and method of incorporating touch detection and hover detection into a display.

BACKGROUND

When a user interacts with a digital display, such as an organic light emitting diode (OLED) display panel, which may be part of a computer, tablet, or smart phone display, it may be advantageous to detect when a user touches the display or when a user's hand or finger is near the display. To provide high quality user interaction, it may be advantageous to detect the touch of one or more of the user's fingers, including the location of each contact point on the display. It may also be helpful to detect, separately and simultaneously, the proximity of one or more fingers, i.e., their presence in a volume in front of the display, which may be referred to as hover detection, and the location of each such finger, in three dimensions, relative to the surface of the display.

Existing methods of touch sensing in displays may use capacitive sensing or other techniques which may exhibit pre-touch, i.e., which may incorrectly report the touch of a human finger when the finger is near but not in contact with the display. Other methods based on optical sensing of fingers may be sensitive to ambient light. Moreover, existing techniques may have poor accuracy in estimating the distance of a finger from a display, and may lack the ability to reliably and accurately determine the respective positions of multiple fingers near a display. Thus, an improved system and method for detecting touch of, and proximity to, a display is needed.

The above information disclosed in this Background section is only for enhancement of understanding of the background of the invention and therefore it may contain information that does not form the prior art that is already known in this country to a person of ordinary skill in the art.

SUMMARY

One flexible touch interaction technique utilizes optical imaging. In this technique, the goal of the imaging is to sample the IR light spatially across the display to determine the locations of touches to the display surface. Imaging principles allows for multi-finger interaction without the problems of ghosting or occlusion.

An aspect of an embodiment of the present invention is an in-cell optical detection system to estimate the position of multiple fingers in the vicinity of the display surface as well as register a definitive time and place at which the finger makes and breaks contact with the display surface. Multiple techniques are incorporated for introducing different bands of infrared (IR) light to the display system, and disambiguating these IR sources using narrow-band detectors.

According to one embodiment, an OLED panel contains two sets of sensors, e.g., embedded quantum dot photo-detectors, which have the capability of responding differentially to different narrow-band light emission. A first one of these sets of sensors is activated when a finger makes contact with the display surface. The IR light for this function is constrained to a waveguide material in the display's front surface. When a finger makes contact with this waveguide material, it frustrates total internal reflection and scatters light downwards to the photodetector elements. A second IR emitter, in a slightly different band, emits IR from the OLED panel directly with spatial-temporal control over the emission. The second set of sensors, e.g., quantum dot detectors, can be coordinated with the second emitter to detect light reflections from objects in the vicinity of the display.

Such a system may be capable of disambiguating touch from, proximity, e.g., hovering, and may not be susceptible to the pre-touch problem (where the display registers a touch prior to the finger making contact with the display). It may also offer an easily implemented lower-power mode by disabling the hover sensing, and may be capable of interacting with light-pens, laser pointers, gloved fingers, ungloved fingers and stylus tools. Using special principles of spatio-temporal control of the second emitters and an estimate of the point spread function of the sensed image it may be possible to achieve superior resolving power and distance estimation compared to existing techniques.

According to an embodiment of the present invention there is provided a system for sensing proximity to, and touching of, a transparent layer having two principal surfaces, the layer forming the outer surface of a display, the system including: a first emitter of light, configured to emit light at a first infrared wavelength into a region between the two principal surfaces; a plurality of second emitters of light, configured to emit light at a second infrared wavelength differing from the first infrared wavelength and to illuminate a volume exterior to the display; a plurality of first sensors in the interior of the display, configured to sense light at the first infrared wavelength; and a plurality of second sensors, configured to sense light at the second infrared wavelength.

In one embodiment, the system includes a processing unit configured to: receive signals from the plurality of first sensors; determine whether an object is in contact with the layer; and identify a region of the layer in which the object is in contact with the layer when an object is in contact with the layer.

In one embodiment, the system includes a processing unit configured to: receive signals from the plurality of second sensors; determine whether an object is in the volume exterior to the display; and estimate the position of the object within the volume exterior to the display when an object is in the volume exterior to the display.

In one embodiment, the processing unit is configured to control the illumination of each of the plurality of second emitters of light.

In one embodiment, the processing unit is configured to: turn on a first subset of the plurality of second emitters of light at the beginning of a time interval; turn off the first subset of the plurality of second emitters of light at the end of the time interval; and estimate the position of the object within the volume exterior to the display from changes, in the signals received from the plurality of second sensors, at the beginning and end of the time interval.

In one embodiment, the processing unit is configured to: turn on a first subset of the plurality of second emitters of light during a first time interval; turn on a second subset of the plurality of second emitters of light during a second time interval; and estimate the position of the object within the volume exterior to the display from the signals received from the plurality of second sensors during the first time interval and from the signals received from the plurality of second sensors during the second time interval.

In one embodiment, the processing unit is configured to turn on subsets of the plurality of second emitters to create a raster pattern of illumination.

In one embodiment, the processing unit is configured to turn on subsets of the plurality of second emitters to create a horizontal sweep of illumination; and turn on subsets of the plurality of second emitters to create a vertical sweep of illumination.

In one embodiment, the processing unit is configured to estimate the position of the object within the volume exterior to the display; and turn on a subset of the plurality of second emitters, the subset being near the estimated position of the object.

In one embodiment, a sensor of the plurality of first sensors includes a quantum dot detector.

In one embodiment, the plurality of first sensors includes an optical filter.

In one embodiment, a sensor of the plurality of first sensors includes: a first quantum dot detector having a first cutoff frequency; and a second quantum dot detector having a second cutoff frequency.

In one embodiment, a sensor of the plurality of second sensors includes a quantum dot detector.

In one embodiment, the plurality of second sensors includes an optical filter.

In one embodiment, a sensor of the plurality of second sensors includes: a first quantum dot detector having a first cutoff frequency; and a second quantum dot detector having a second cutoff frequency.

In one embodiment, the system includes a processing unit configured to: receive signals from the plurality of second sensors; and determine where an object exterior to the display is from the point spread function of light reflected from the object and sensed by the plurality of second sensors.

In one embodiment, the second emitters of light are configured to be turned off when the system is operating in a low-power mode.

According to an embodiment of the present invention there is provided a method for sensing proximity to, and touching of, a transparent layer having two principal surfaces, the layer forming the outer surface of a display, the method including: emitting light at a first infrared wavelength, by a first emitter of light, into a region between the two principal surfaces; emitting light at a second infrared wavelength differing from the first infrared wavelength, by a plurality of second emitters of light, illuminating a volume exterior to the display; sensing light at the first infrared wavelength, by a plurality of first sensors in the interior of the display; and sensing light at the second infrared wavelength, by a plurality of second sensors.

In one embodiment, the first emitter is configured to emit light primarily in the wavelength range 750 nm to 850 nm, and the plurality of second emitters of light is configured to emit light primarily in the wavelength range 850 nm to 950 nm.

BRIEF DESCRIPTION OF THE DRAWINGS

These and other features and advantages of the present invention will be appreciated and understood with reference to the specification, claims and appended drawings wherein:

DETAILED DESCRIPTION

The detailed description set forth below in connection with the appended drawings is intended as a description of exemplary embodiments of a proximity/touch sensing surface for integration with an OLED display provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Expressions such as "at least one of," when preceding a list of elements, modify the entire list of elements and do not modify the individual elements of the list. Further, the use of "may" when describing embodiments of the present invention refers to "one or more embodiments of the present invention".

Figure 1:
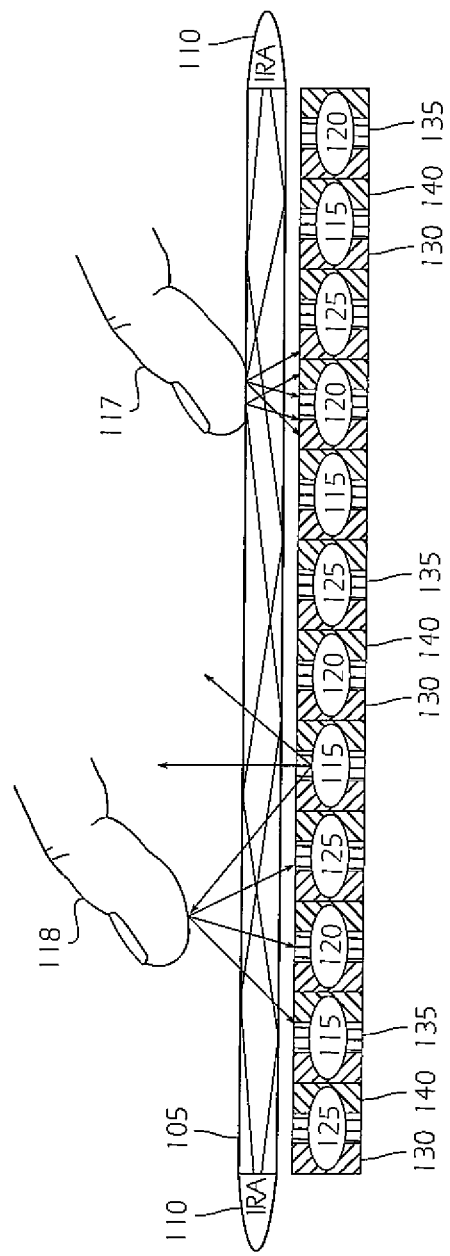
FIG. 1 is a cross sectional view of a display according to an embodiment of the present invention.

In one embodiment of the present invention, the principle of FTIR (frustrated total internal reflection) is used for the touch-sensitive component of the display system. Referring to FIG. 1, a transparent layer 105, which may be the top-most layer of protective glass within a display, is used as an IR waveguide by optically bonding several first emitters of light 110, which may be first IR LEDs 110 (also identified as IRA in FIG. 1) to the edge of the glass. These first IR LEDs 110 that are bonded to the waveguide have a narrow spectral bandwidth emission that may be centered on a first IR wavelength. Total internal reflection will cause the IR light to remain in-plane within the transparent layer 105 until an object touches the surface and scatters this light so that it can be detected by a set of first sensors 120, e.g., photodetectors embedded in the display.

The first sensors 120 may be wavelength-selective sensors, e.g., sensors which are sensitive to certain wavelengths of IR light and not to others. In one embodiment they are constructed from quantum dots. These dots may be tuned such that they are sensitive to the particular band of IR light injected into the waveguide. These first sensors 120 may be constructed to be insensitive to other IR light which may be emitted, e.g., as part of the hover detection component of the display system. The first sensors 120 may be capable of registering the position when an object, such as finger 117, comes into contact with the display front surface and scatters light towards the detectors.

The second component of the display's sensing capability is hover sensitivity, e.g., the ability to detect an object that is near but not touching the display, i.e., in a volume in front of the display and exterior to the display. A set of second emitters 115 may be used for this purpose. The IR light emitted by the second emitters 115, and used for hover sensing, may be in a separate wavelength band centered on a second IR wavelength and different from the light, centered on the first wavelength, used for touch sensing. The second emitters 115 may be IR OLEDs (IRB) embedded in the display plane and there may be spatial as well as temporal control over when and where they are activated. A set of second sensors 125, e.g., photodetectors embedded in the display, may be configured to be sensitive to IR light, in the wavelength range of the second emitters 115, which may be reflected from a finger, such as finger 118, hovering near the display. The second emitters 115, the first sensors 120, and the second sensors 125 may all be embedded in the display among pixel elements emitting visible light, e.g., red pixel elements 130, green pixel elements 135, and blue pixel elements 140.

The emitters 110, 115 and the sensors 120, 125 may be configured such that hover detection light, emitted by the second emitters 115 at the second wavelength, does not excite the first sensors 120. This may be accomplished, for example, by selecting the second wavelength, i.e., the wavelength used for hover sensing, to be longer than the first wavelength, i.e., the wavelength used for the touch sensing. The touch interaction may be given priority over hover sensing in the sense that a finger touching the transparent layer may scatter light to which both the first sensors 120 and the second sensors 125 are sensitive, whereas a hovering finger may reflect light to which only the second sensors 125 are sensitive. This may be accomplished by using higher-energy wavelengths, i.e., shorter wavelengths, for touch than for hover, and using, for the first sensors 120 and for the second sensors 125, quantum dot detectors with different tuned wavelengths. Individual quantum dot units may respond to all photons with shorter wavelengths than their tuned wavelengths, but are transparent (do not respond) to longer wavelength photons. Using a longer wavelength for the second sensors 125 substantially eliminates the possibility of the light used for hover detection interfering with touch detection. Even if there are strong specular reflections from the hover-sensing light, this light does not interfere with the quantum dot subunits making up the first sensors 120.

When a finger hovers above the display, one or more of the second emitters 115 will illuminate the finger. The finger then reflects some of the light such that it illuminates the panel. One or more second sensors 125 will detect this light and the first sensors 120 will not. Thus, if the first sensors 120 are not activated, a touch has not occurred and this system will not be susceptible to pre-touch problems. When there is contact with the display, one or more of the first sensors 120 detects the position of the contact; one or more of the second sensors 125 sensor may also be activated, but this signal only confirms the touch detection from the first sensors 120. In one embodiment, the touch sensing system may be used in a low-power mode by disabling the hover detection system.

Figure 2:
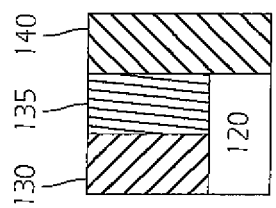
FIG. 2 is a front view of a pixel including red, green, and blue pixel elements and an embedded sensor according to an embodiment of the present invention.

FIG. 2 shows an example layout in which a first sensor 120 shares a square or rectangular pixel region with a red pixel element 130, a green pixel element 135, and a blue pixel element 140. In other embodiments, the locations, relative sizes, or shapes of the first sensor 120, the red pixel element 130, the green pixel element 135, and the blue pixel element 140 within the pixel may be different from those illustrated in FIG. 2. Similar layouts may be used for the second sensors 125. The resolving power of hover detection may be enhanced using spatio-temporal control over the second emitters 115. If all of the second emitters 115 are activated, i.e., turned on, simultaneously, the second sensors 125 will sense reflections from the fingers directly above them (which are strongly illuminated) but also from oblique objects (which are also strongly illuminated). If instead, the second emitters 115 are activated sequentially, it is possible to achieve superior resolvability of details.

Figure 3:
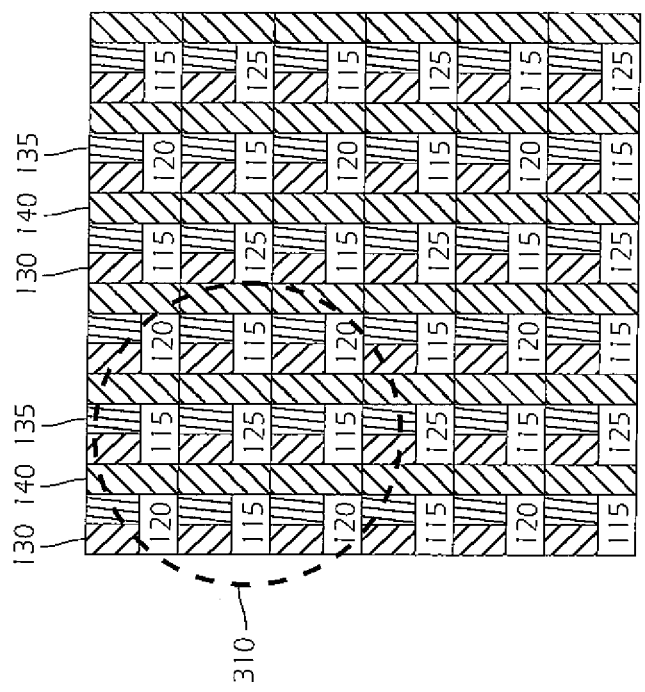
FIG. 3 is a top view showing a mosaic of pixel elements, and sensors and emitters embedded in a display according to an embodiment of the present invention.

One such approach is illustrated in FIG. 3, which shows an example of a mosaic pattern of second emitters 115, first sensors 120, and second sensors 125, integrated with the red pixel elements 130, green pixel elements 135, and blue pixel elements 140 of a display panel. At one instant in time, the region within the dashed circle 310 may be active for hover detection, i.e., the second emitters 115 within the dashed circle 310 may be activated, and the second sensor 125 at the center of the dashed circle 310 may be read out, to determine the extent to which light from the activated second emitters 115 is reflecting from a nearby object, such as a finger hovering near the display panel in the vicinity of the dashed circle 310. This pattern, including four activated second emitters 115 and one central second sensor 125 to be read out, may then be moved on the display panel so that a different set of second emitters 115 is activated, and a different second sensor 125 is read out. For example, the second sensor 125 and the set of adjacent second emitters 115 may be moved in a raster pattern serially covering the display pattern from left to right and bottom to top.

The raster-based approach to hover sensing may be quite slow; it may be accelerated by processing groups of second emitters 115 and second sensors 125 at a time. Distant regions on the display will have little interaction and thus it is possible to accelerate the process by following a pattern of subsampling the pixels at spatial intervals until all the different locations are sampled. Furthermore, based on the spread of the second emitters 115, they may be activated in groups with little or no detrimental impact on resolving power.

In one embodiment for providing rapid hover detection, the detection measurements may be captured in a coarse checkerboard fashion to achieve complete coverage of the sensor grid in two measurements. A moderately fast implementation would be to illuminate and collect measurements from columns spaced approximately 3 cm apart followed by rows 3 cm apart (a set of horizontal and vertical sweep measurements as opposed to raster measurements). For a 9 cm by 12 cm display, sampling in this fashion with 2.5 mm groups, each group including at least one second emitter 115 and at least one second sensor 125, it is possible to sample the full grid in 28 serial measurements. Conversely, in the straight raster approach at 2.5 mm units, it would take nearly 2000 serial measurements.

In a more complicated approach with a feedback loop, the system could capture one full-field strobe exposure to identify coarsely where objects of interest are present, and then perform fine sampling to resolve details in these areas with targeted coupled activation of second emitters 115 and reading out of second sensors 125. This implementation would require full real-time control over the IR illumination stage.

Thus, the improvement of resolving power by spatio-temporal control may involve activating a first subset of the second emitters 115, reading out one or more second sensors 125, and then repeating this process for one or more additional subsets of the second emitters 115 and second sensors 125, and from the readings obtained from the second sensors, or from the changes in these readings with different illumination conditions, i.e., different combinations of activated second emitters 115, infer the locations of fingers or other objects in a volume in front of and exterior to, the display.

In one embodiment, quantum dot detectors enable the simultaneous detection of hover and touch interactions with the display. In another embodiment, which maintains the same functionality but does not require narrow bandwidth discrimination, IR photodetectors which are not wavelength-selective are used, and the sources of the IR light are temporally modulated. In one embodiment, the light from the first emitters 110 is strobed in counter phase with the hover detection emitters, i.e., the second emitters 115, using the same IR wavelengths.

Figure 4:
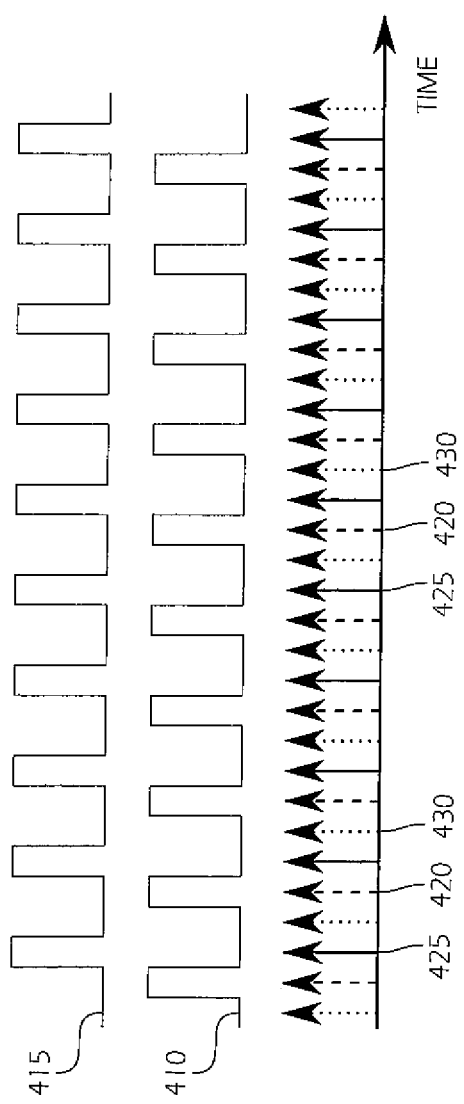
FIG. 4 is a plot of activation waveforms for two IR emitters and of readout sampling times according to an embodiment of the present invention.

FIG. 4 demonstrates how hover, touch and ambient light level can be measured sequentially without contaminating the other measures. This method might have a slight tendency towards having greater noise as there is a firm constraint on the duration that can be used for a light measurement. A first activation waveform 410 for the first emitters 110 is offset in time from a second activation waveform 415 for the second emitters 115, so that both sets of emitters are not activated simultaneously. Touch measurements are made at a first set of points (time points) 420, during which the first emitters 110 are active, and hover measurements are made at a second set of points 425, during which the second emitters 115 are active. In addition there may be an interval in each cycle during which no emitter is active, and ambient light measurements may be made at a set of points 430 in these intervals. Temporal multiplexing may make it unnecessary to use wavelength-selective sensors.

Estimating the distance of a hovering object may be challenging. The intensity of a reflection on a given sensor of the second sensors 125 will be influenced by the emitter strength, the size of the object, the reflectivity of object and the distance to the object. A single sensor unit may not be effective at disambiguating these factors. However, the spread function of an object may be greatly influenced by the distance and may only be slightly affected by size and reflectivity.

Figure 5:
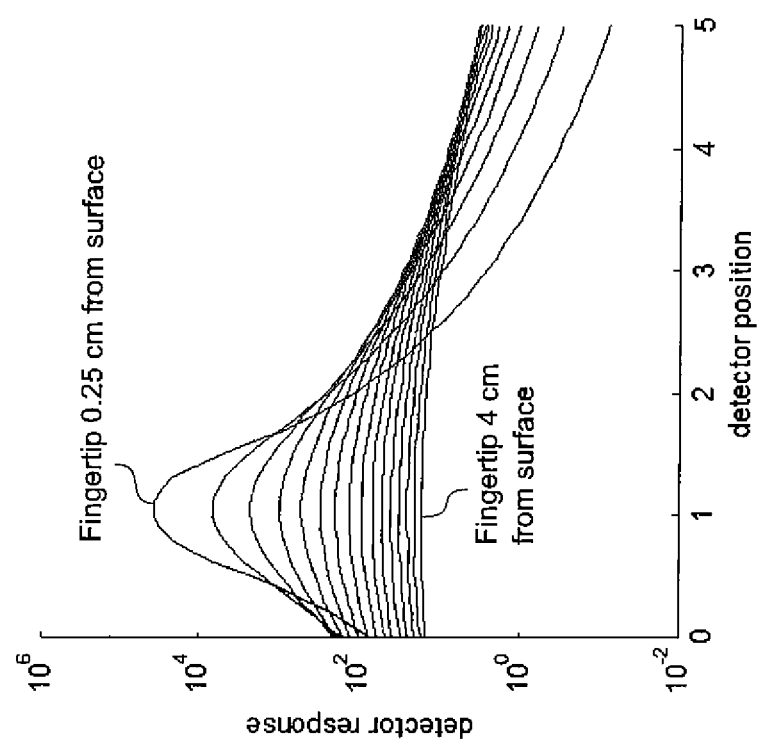
FIG. 5 is a plot of detector (i.e., sensor) response plotted against detector position for various fingertip-surface distances according to an embodiment of the present invention.

FIG. 5 shows the sensor response as a function of position on the detector (in cm) for an object at a sweep of different distances, and illustrates how the spread of a fingertip may change on the sensor surface with distance. The peak magnitude changes greatly with distance, but magnitude differences are also expected with changes in size and reflectivity. The spread of the distribution changes greatly with the distance, but the spread is not expected to be modified significantly by the reflectivity. Thus, an algorithm designed to estimate the spread function of objects may be used to form a rough estimate of distance. The task of blind estimation of a spread function is challenging. The spread function could easily be influenced by unintended parts of the finger reflecting light and by ambient light levels. Nevertheless, the use of the second-order signal fall-off as a distance estimator may give a more reliable distance estimate than intensity alone.

The resolution of a hover detection system built according to an embodiment of the present invention may be inferior to that of the touch-detection system because the scattered reflections from hovering fingertips have a greater distance to spread before being detected. According to one estimate, at 1 cm hover height, two fingers will be discriminable as two fingers if they are separated (center to center) by 2.0 cm assuming all of the second emitters 115 are simultaneously illuminated, the emission properties and the detector properties are Lambertian, emission and sensitivity fall off as the cosine of the angle of incidence, and there is no ambient lighting or noise in the system.

Performance may be enhanced by timing the emission of the second emitters 115 with the second sensors 125. By using spatially localized emission from the second emitters 115, and reading from the adjacent second sensors 125, at 1 cm hover distance, the resolution may improve to 1.5 cm separation. At 2 cm distance, fingers separated by 2.5 cm may be resolvable. Localization of a single finger may be fairly good, with some difficulty at the edges of the display.

Measures of performance, such as the ability to separately and simultaneously resolve two fingers, may be estimated from a ray-trace model of the round-trip path light would take between an emitter, a reflective object, and the sensor array. Such a model makes it possible to estimate the fall-off of the detected magnitude of the reflection from a scattering object. A ray-trace model may be used to estimate the signal at a given sensor in three acts: (i) given a set of emitters in the display, determining how much light is falling upon a reflective object (such as a blunt fingertip); (ii) given that the fingertip may be completely non-specular, treat the fingertip as a set of point emitters; and (iii) for each detector, calculate the expected signal given the contributions of all the reflective objects.

Figure 6A:
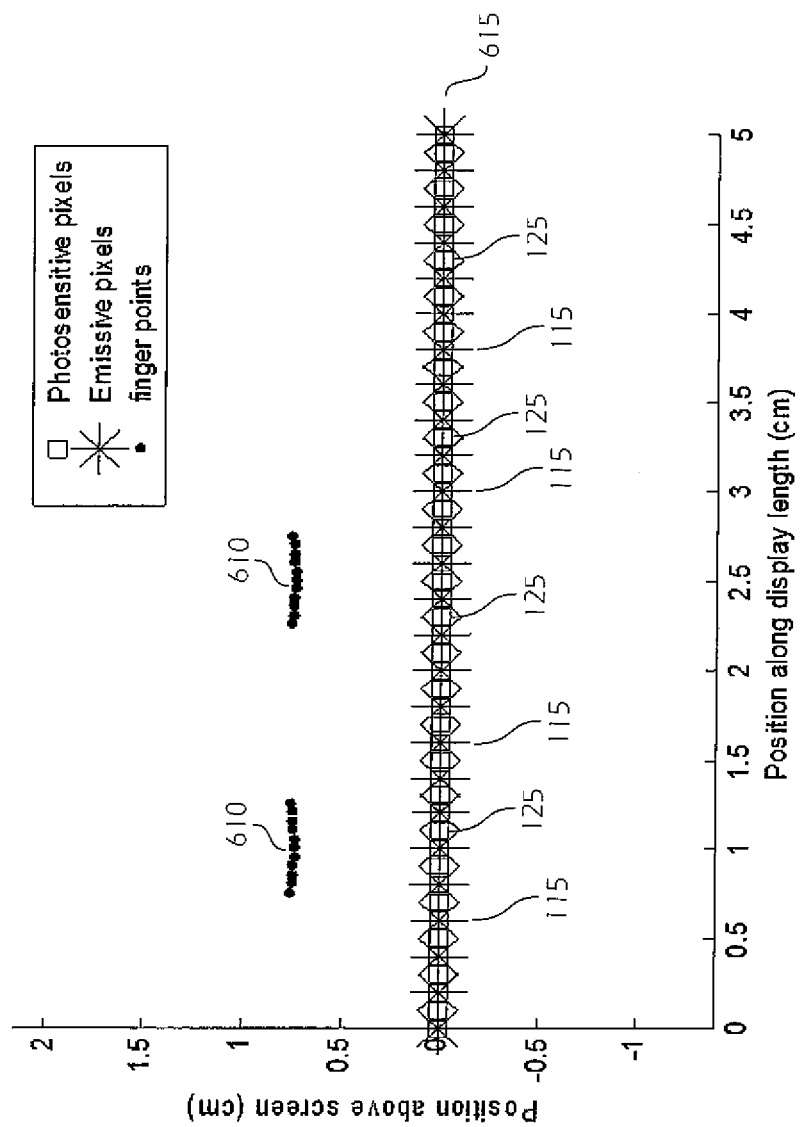
FIG. 6A is a schematic side view of the geometry assumed in a simulation of sensing capabilities according to an embodiment of the present invention.
Figure 6B:
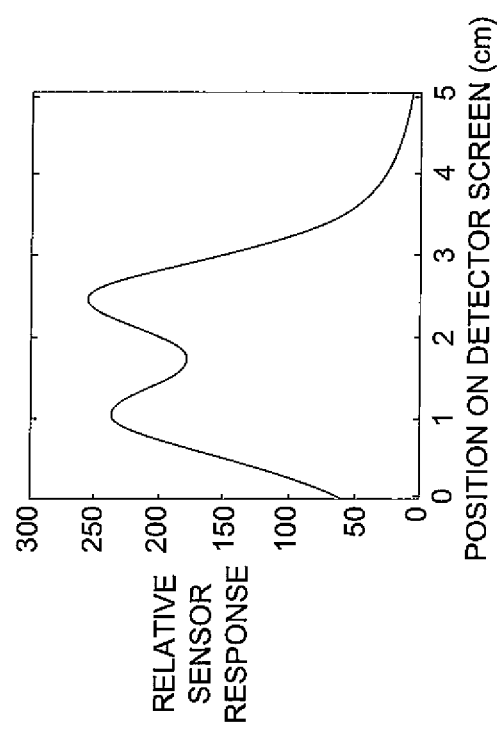
FIG. 6B is a plot of sensor response against sensor position on the display according to an embodiment of the present invention.

Such an approach makes it possible to predict the light footprint that a reflective object will have on the detector array and to examine the system's ability to discriminate whether there are two reflective objects or a single reflective object. FIG. 6A depicts the situation with two finger tips 610 elevated above the display surface. The display surface contains second emitters 115 and second sensors 125. The fingertips are shown as black lines. For the case shown, the response of the second sensors 125, which are distributed across the surface of the display to form a detector screen, is plotted in FIG. 6B. With the 1.5 cm of finger separation and 0.75 cm elevation, there is a signal in which the two fingers can be resolved from one another.

Figure 7:
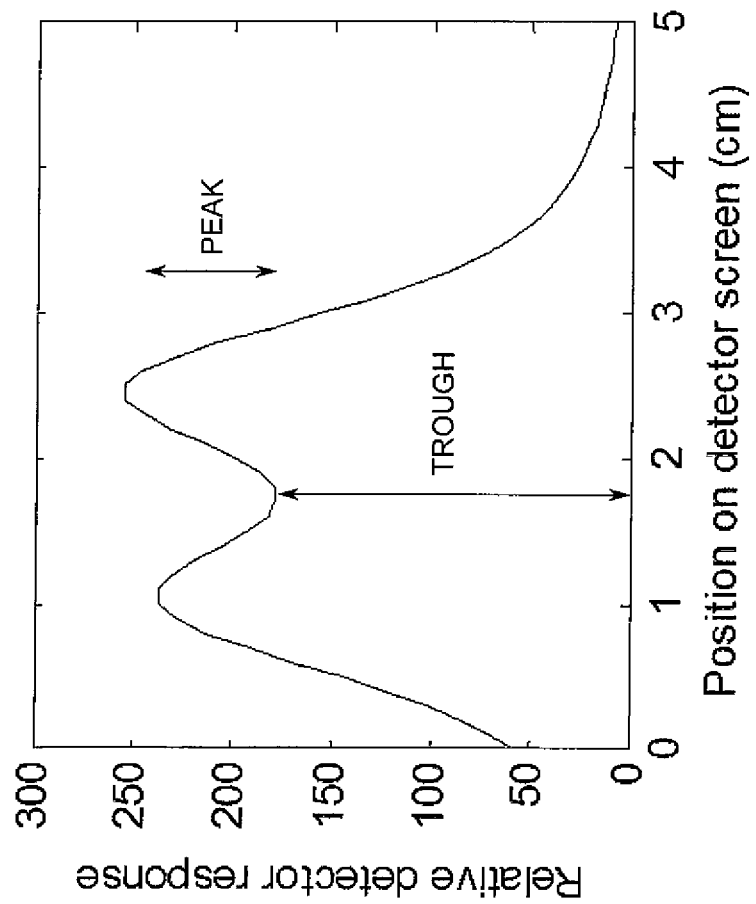
FIG. 7 is a plot of sensor response against sensor position on the display, showing definitions of peak and trough according to an embodiment of the present invention.

The resolvability of two finger tips can be expressed as a ratio of peak to trough, i.e., a ratio of the average strength of finger signal (with reference to the minimum between them), and the brightness of the minimum between them, as illustrated in FIG. 7. When this ratio is large, the gesture can be detected accurately, with both finger tips resolved. When the ratio is small, the finger tips may appear as a single point, and the gesture may be misinterpreted.

Figure 8:
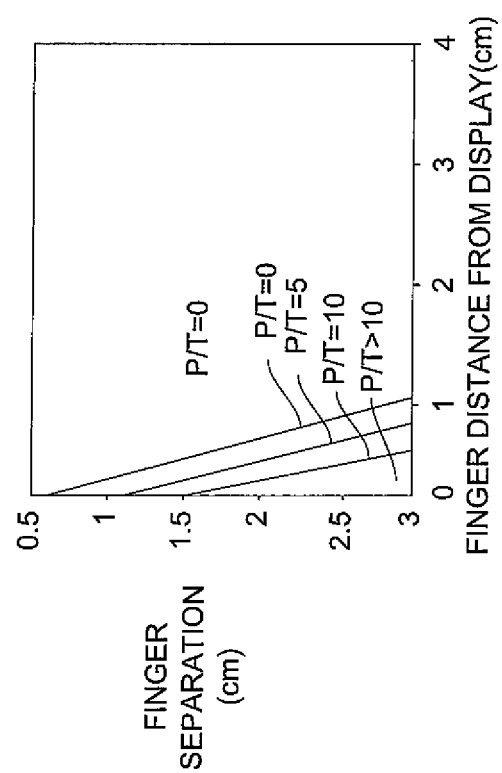
FIG. 8 is a contour plot of peak to trough ratios against finger separation and finger distance from the surface of a display according to an embodiment of the present invention.

This ratio can be plotted as a function of both the finger distance (distance between fingers and the display) and the finger separation (center to center distance between two 0.5 cm-wide fingertips). This is plotted as a contour plot in FIG. 8. The region for which the peak-to-trough ratio (PIT) is greater than 10 has a very strong signal indicating two fingers. The region for which the peak-to-trough ratio (P/T) is 0 shows separation/distance combinations where the two fingers are not resolvable. Based on this visual, the display according to one embodiment is envisioned to be unable to resolve fingers unless they are both close to the display and far apart. This level of performance would not lead to a satisfying user experience on a small display as one would need to hover very close to the display without touching it.

Figure 9B:
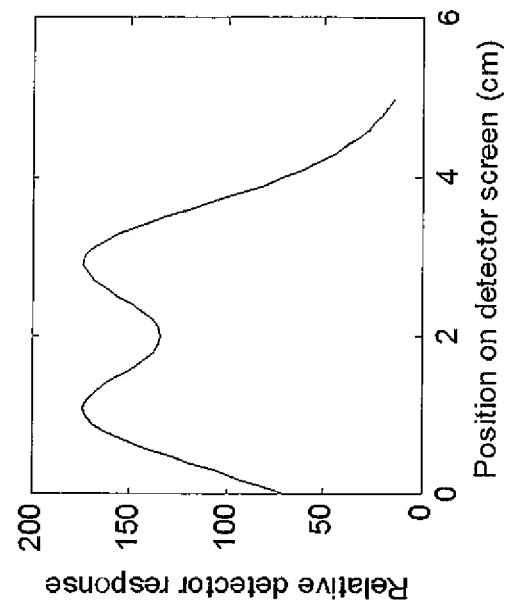
FIG. 9B is a plot of sensor response against sensor position according to an embodiment of the present invention.
Figure 9A:
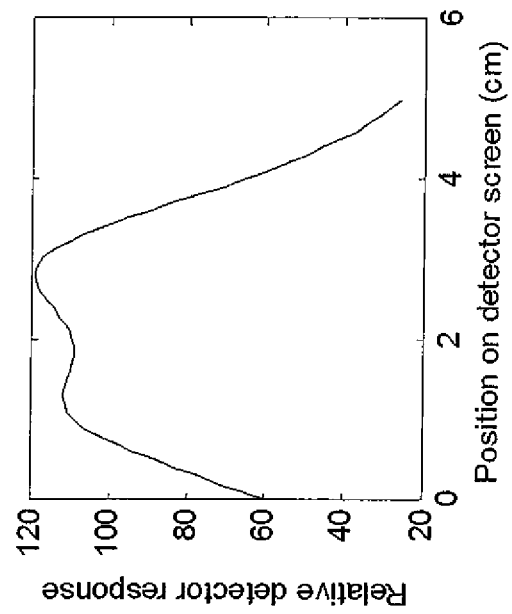
FIG. 9A is a plot of sensor response against sensor position according to an embodiment of the present invention.

One way to get substantial improvement is to couple spatial detection with spatial illumination. With the approach as described, when all the second emitters 115 are used simultaneously, all the objects near the display will have an illumination level that varies only with distance. By using the second emitters 115 selectively with the adjacent second sensors 125, the light illuminating the fingers can be a function of both the distance above the display and lateral distance. The detected light from lateral objects can be greatly reduced by not illuminating them strongly. This allows the detectors to achieve greater spatial resolution than is possible with full field illumination. FIGS. 9A and 9B show the expected response at the second sensors 125 to the same finger positions using a full-field illumination (full-field strobe) and using spatial-temporal illumination (emitter-detector temporal coupling), respectively.

Figure 10:
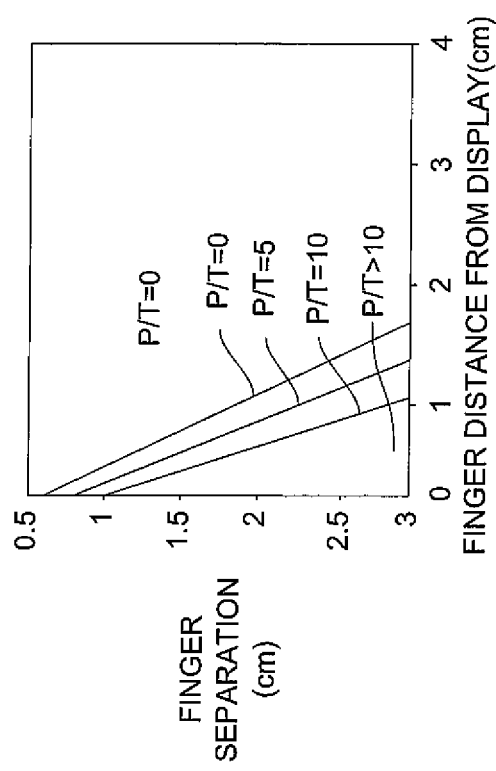
FIG. 10 is a contour plot of peak to trough ratios against finger separation and finger distance from the surface of a display according to an embodiment of the present invention.

FIG. 10 shows a contour plot of P/T ratios as a function of finger separation and of finger distance from the display, for hover detection using emitter-sensor temporal coupling, i.e., localized illumination using spatio-temporal control over the second emitters 115. As is evident when comparing FIG. 10 to FIG. 8, localized illumination using spatio-temporal control over the second emitters 115 can nearly double the effective distance, or halve the separation between the fingers to achieve a workable signal.

The simulation results of which are shown in FIGS. 5 and 6B through 10 is based on the principle that light is radiated in a Lambertian fashion. With simple optics and baffling it may be possible to greatly improve upon the spatial resolvability of hovering objects. It may become possible to design the emitters to project nearly collimated light which could greatly enhance the resolving power when coupled with emitter-sensor temporal coupling.

With approximately Lambertian illumination and detection, given adequate power, a display constructed according to an embodiment of the present invention may be capable of detecting separate finger hover gestures in a space over the display extending up to 2-3 cm, and localizing them nearly to the edge of the display. The display could interact effectively with IR light pens, IR laser pointers, fingers and possibly a passive stylus. One issue regarding the use of laser pointers and light pens is that they would behave very differently in hover mode. Laser pointers would be detected at the location where they are pointing with no distance signal. Light pens would be detected at the location of the tip regardless of where they are pointing.

A display constructed according to an embodiment of the present invention may also be used as a low quality black and white flatbed scanner. With a tight enough sensor spacing, it may be possible to put a business card flush against a phone display, for example, and have the display read all the data from the business card.

The implementation of two distinct sets of IR light emitters also lends itself towards a power saving mode in which only the waveguide touch system is active while the emitter system is dormant.

A display's ability to detect IR lighting may also be used to detect some of the ambient lighting that falls on the display and enable adaptive algorithms for image enhancement based on the light falling on the screen.

In an embodiment including two sets of wavelength-selective sensors, it may be possible to differentiate two light-pens. For example, the display could determine if the light pen was being used in the conventional direction or reversed and being used as an eraser.

Touch detection and hover detection may be performed with embodiments which include a processing unit. The term "processing unit" is used herein to include any combination of hardware, firmware, and software, employed to process data or digital signals. Processing unit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs).

Figure 11:
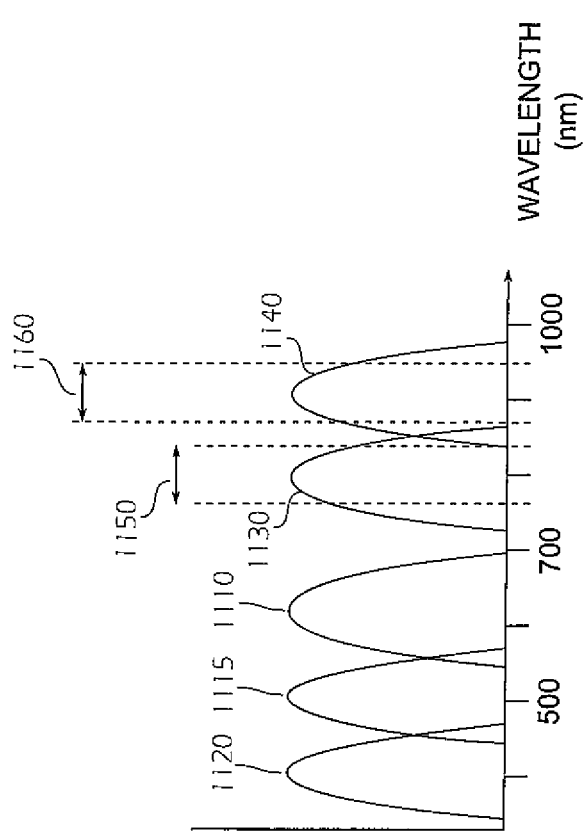
FIG. 11 is a plot of emission spectra of pixel elements and infrared emitters according to an embodiment of the present invention.

FIG. 11 shows emission spectra of pixel elements and of first and second emitters, as well as regions of spectral sensitivity of the first and second sensors, according to one embodiment. In particular, spectra 1110, 1115, and 1120 may be the emission spectra of the red, green and blue pixel elements respectively, falling in the visible range of wavelengths. Spectrum 1130 may be the emission spectrum of the first emitters, and spectrum 1140 may be the emission spectrum of the second emitters; spectrum 1140 may be centered on a wavelength longer than the center wavelength of the first emitters. In one embodiment the first sensors may be sensitive over a first wavelength range 1150, and the second sensors may be sensitive over a second wavelength range 1160. In other embodiments, as described above, the spectral sensitivity of the sensors may instead be such that only the second sensors are sensitive to the spectrum 1140 of the second emitters, and both the first sensors and the second sensors are sensitive to the spectrum 1130 of the first emitters.

Although exemplary embodiments of the proximity/touch sensing surface for integration with an OLED display have been specifically described and illustrated herein, many modifications and variations will be apparent to those skilled in the art. For example, although embodiments of the present invention include a full system incorporating optical hover and touch sensing, the hover detection approach may be implemented alone, in an embodiment lacking touch sensing, or combined with conventional touch panels. As another example, embodiments of the present invention may be practiced with another type of display, such as an LCD display. Accordingly, it is to be understood that a proximity/touch sensing surface for integration with an OLED display constructed according to principles of this invention may be embodied other than as specifically described herein. The invention is also defined in the following claims, and equivalents thereof.

What is claimed is:

1. A system for sensing proximity to, and touching of, a transparent layer having two principal surfaces, the layer forming an outer surface of a display, the system comprising:
    a first emitter of light, configured to emit light, during a first time interval, at a first infrared wavelength into a region between the two principal surfaces;
    a plurality of second emitters of light, configured to emit light, during a second time interval, at a second infrared wavelength longer than the first infrared wavelength and to illuminate a volume exterior to the display;
    a plurality of first sensors in an interior of the display, configured to sense light, during the first time interval and during a third time interval, at the first infrared wavelength and configured to be insensitive to light at the second infrared wavelength; and a plurality of second sensors, configured to sense light, during the second time interval and during the third time interval, at the first infrared wavelength and at the second infrared wavelength, the first time interval, the second time interval, and the third time interval not overlapping in time, the first emitter being configured not to emit light during the second time interval and the third time interval, the second emitters being configured not to emit light during the first time interval and the third time interval.

2. The system of claim 1, comprising a processing unit configured to:
receive signals from the plurality of first sensors;
determine whether an object is in contact with the layer; and
identify a region of the layer in which the object is in contact with the layer when an object is in contact with the layer.

3. The system of claim 1, comprising a processing unit configured to:
receive signals from the plurality of second sensors;
determine whether an object is in the volume exterior to the display; and
estimate a position of the object within the volume exterior to the display when an object is in the volume exterior to the display.

4. The system of claim 3, wherein the processing unit is configured to control the illumination of each of the plurality of second emitters of light.

5. The system of claim 4, wherein the processing unit is configured to turn on subsets of the plurality of second emitters to create a raster pattern of illumination.

6. The system of claim 4, wherein the processing unit is configured to
turn on subsets of the plurality of second emitters to create a horizontal sweep of illumination; and
turn on subsets of the plurality of second emitters to create a vertical sweep of illumination.

7. The system of claim 4, wherein the processing unit is configured to
estimate the position of the object within the volume exterior to the display; and
turn on a subset of the plurality of second emitters, the subset being near the estimated position of the object.

8. The system of claim 1, wherein a sensor of the plurality of first sensors comprises a quantum dot detector.

9. The system of claim 1, wherein the plurality of first sensors comprises an optical filter.

10. The system of claim 1, wherein a sensor of the plurality of first sensors comprises:
a first quantum dot detector having a first cutoff frequency; and
a second quantum dot detector having a second cutoff frequency.

11. The system of claim 1, wherein a sensor of the plurality of second sensors comprises a quantum dot detector.

12. The system of claim 1, wherein the plurality of second sensors comprises an optical filter.

13. The system of claim 1, wherein a sensor of the plurality of second sensors comprises:
a first quantum dot detector having a first cutoff frequency; and
a second quantum dot detector having a second cutoff frequency.

14. The system of claim 1, comprising a processing unit configured to:
receive signals from the plurality of second sensors; and
determine where an object exterior to the display is from a point spread function of light reflected from the object and sensed by the plurality of second sensors.

15. The system of claim 1, wherein the second emitters of light are configured to be turned off when the system is operating in a low-power mode.

16. A method for sensing proximity to, and touching of, a transparent layer having two principal surfaces, the layer forming an outer surface of a display, the method comprising:
emitting light at a first infrared wavelength, by a first emitter of light, during a first time interval, not during a second time interval, and not during a third time interval, the first time interval, the second time interval, and the third time interval not overlapping in time, into a region between the two principal surfaces;
emitting light at a second infrared wavelength longer than the first infrared wavelength, by a plurality of second emitters of light, during the second time interval, not during the first time interval, and not during the third time interval, illuminating a volume exterior to the display;
sensing light at the first infrared wavelength, by a plurality of first sensors in an interior of the display, during the first time interval and during the third time interval, the first sensors being configured to be insensitive to light at the second infrared wavelength; and
sensing light at the second infrared wavelength, by a plurality of second sensors, during the second time interval and during the third time interval, the second sensors being configured to sense light at the first infrared wavelength and at the second infrared wavelength.

* * * * *